US009483552B2

(12) United States Patent
Tahiliani et al.

(10) Patent No.: US 9,483,552 B2
(45) Date of Patent: *Nov. 1, 2016

(54) SYSTEM AND METHOD FOR PROCESSING AND DISTRIBUTION OF UNSTRUCTURED DOCUMENTS

(71) Applicant: Sanah, Inc., Sacramento, CA (US)

(72) Inventors: Rajnish Tahiliani, El Dorado Hills, CA (US); Kartik Yegneshwar, Rancho Cordova, CA (US); Monica Tahiliani, El Dorado Hills, CA (US); Kou Vang, El Dorado Hills, CA (US)

(73) Assignee: Sanah, Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,341

(22) Filed: Feb. 19, 2014

(65) Prior Publication Data

US 2014/0172865 A1  Jun. 19, 2014

Related U.S. Application Data (63) Continuation of application No. 12/381,469, filed on Mar. 12, 2009, now Pat. No. 8,675,221.

(51) Int. Cl.
*G06F 15/00* (2006.01)
*G06F 17/30* (2006.01)
*G06Q 10/00* (2012.01)

(52) U.S. Cl.
CPC ......... *G06F 17/30705* (2013.01); *G06Q 10/00* (2013.01)

(58) Field of Classification Search
None
See application file for complete search history.

(56) References Cited

U.S. PATENT DOCUMENTS

| | | |
|---|---|---|
| 5,396,607 A | 3/1995 | Shimatani |
| 5,664,109 A * | 9/1997 | Johnson et al. ............... 705/2 |
| 5,732,221 A | 3/1998 | Feldon et al. |
| 5,802,495 A | 9/1998 | Goltra |
| 5,917,529 A | 6/1999 | Hotta et al. |
| 6,317,220 B1 | 11/2001 | Fujita et al. |
| 6,338,039 B1 | 1/2002 | Lonski et al. |
| 6,587,830 B2 | 7/2003 | Singer |
| 6,684,188 B1 | 1/2004 | Mitchell et al. |
| 6,746,399 B2 | 6/2004 | Iliff |
| 6,801,916 B2 | 10/2004 | Roberge et al. |
| 6,938,203 B1 | 8/2005 | Dimarco et al. |
| 7,008,378 B2 | 3/2006 | Dean |
| 7,082,538 B2 | 7/2006 | Bouchard et al. |
| 2003/0046288 A1 | 3/2003 | Severino et al. |
| 2003/0074248 A1 | 4/2003 | Braud et al. |
| 2003/0200234 A1 * | 10/2003 | Koppich et al. ............... 707/203 |
| 2003/0220822 A1 | 11/2003 | Fiala et al. |
| 2006/0007015 A1 | 1/2006 | Krzyzanowski et al. |
| 2008/0071575 A1 | 3/2008 | Climax et al. |
| 2009/0019051 A1 * | 1/2009 | Winburn ............................ 707/9 |
| 2009/0147317 A1 * | 6/2009 | Kiplinger ........... H04N 1/00222 358/474 |
| 2009/0171852 A1 | 7/2009 | Taylor et al. |
| 2009/0172019 A2 | 7/2009 | Duncan et al. |
| 2009/0207442 A1 | 8/2009 | Yamada |
| 2009/0259493 A1 | 10/2009 | Venon et al. |
| 2009/0262384 A1 * | 10/2009 | Carter et al. .................. 358/1.15 |

* cited by examiner

*Primary Examiner* — Helen Q Zong
(74) *Attorney, Agent, or Firm* — Inventive Patent Law P.C.; Jim H. Salter (57) ABSTRACT

A computer-implemented system and method for processing and distribution of unstructured documents are disclosed. The apparatus and method in an example embodiment includes receiving an unstructured document; obtaining information from the document; storing portions of the information obtained from the document in a data set corresponding to the document; using a portion of the information obtained from the document to obtain an identifier of an enterprise record corresponding to the document; recording a specified behavior category for the document; and using the data set and the specified behavior category to dispatch the document to a recipient or an enterprise.

14 Claims, 9 Drawing Sheets

SYSTEM AND METHOD FOR PROCESSING AND DISTRIBUTION OF UNSTRUCTURED DOCUMENTS

PRIORITY PATENT APPLICATION

This is a continuation patent application drawing priority from co-pending U.S. patent application Ser. No. 12/381,469; filed Mar. 12, 2009. This present patent application draws priority from the referenced patent application. The entire disclosure of the referenced patent application is considered part of the disclosure of the present application and is hereby incorporated by reference herein in its entirety.

BACKGROUND

1. Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2014, Sanah, Inc., All Rights Reserved.

2. Technical Field

This disclosure relates to data processing. More particularly, the present disclosure relates to data processing and distribution of unstructured documents.

3. Related Art

An enterprise often needs to process documents from $3^{rd}$ parties for the benefit of the customers or patients of the enterprise. The enterprise can be a health care provider, government agency, corporation, organization, or other commercial, non-profit, charitable entity, or the like. These documents can include invoices for services rendered by a $3^{rd}$ party, medical/dental lab results, referral information, insurance information, and a variety of other documents the enterprise can use to render service to its customers or patients. Additionally, the enterprise may need to forward or distribute documents to $3^{rd}$ parties for the benefit of the customers or patients of the enterprise. These documents can include prescriptions, care directives, requests for lab tests, invoices to insurance companies, and the like. This flow of documents into and out of the enterprise can be cumbersome and error-prone, especially when the documents are unstructured. Unstructured documents are collections of information, the components of which are not readily distinguishable by computer processing means. A document coded in conventional Portable Document Format (PDF), a file format created by ADOBE SYSTEMS, INC., is an example of an unstructured document. Other examples of unstructured documents include text documents, faxes, emails, image files, video/audio files, and the like. Other document formats can include bit mapped format, binary format, Joint Photographic Experts Group (JPEG) format, Graphics Interchange Format (GIF), Tagged Image Format (TIF), Moving Picture Experts Group (MPEG) format, and Rich Text Format (RTF).

Some solutions offered by conventional document processing systems include defining standardized forms for submittal to the enterprise. However, a broad level of standardization of forms is very difficult to implement. Other conventional solutions, for example, use a managed health care network, wherein $3^{rd}$ party providers must become subscribers prior to submitting documents to the enterprise. Special software is used in a proprietary network to transfer documents. Still other systems use conventional email systems or website downloads to transfer documents to the enterprise. However, such systems are not secure and may not comply with the requirements of governmental regulations, such as the Health Insurance Portability and Accountability Act (HIPAA).

United States Patent Application No. 2003/0074248 discloses a means for an enterprise, such as a health care facility, to receive messages from any one of a plurality of disparate, ancillary vendor applications, convert the vendor information to an enterprise usable form and then store the enterprise information on an enterprise database. The enterprise keeps vendor specific rules for converting each vendor's information to enterprise information. Additionally, relational enterprise rules are applied to the enterprise data stored in a enterprise database, so as disparate vendor information is converted to enterprise data, the relationships between that converted enterprise data are checked with the enterprise data stored in the enterprise database. Enterprise data can also be directly entered into the enterprise database from enterprise system clients, the relationships between that enterprise data are also checked with the enterprise data stored in the enterprise database.

U.S. Pat. No. 5,664,109 discloses a central medical record repository for a managed health care organization that accepts and stores medical record documents in any format from medical service providers. The repository then identifies the document using information automatically extracted from the document and stores the extracted data in a document database. The repository links the document to a patient by extracting from the document demographic data identifying the patient and matching it to data stored in a patient database. Data is extracted automatically from medical records containing "unstructured" or free-form text by identifying conventional organization components in the text and is organized by executing rules that extract data with the aid of such information. Documents for a patient are retrieved by identifying the patient using demographic data.

U.S. Pat. No. 7,082,538 describes a secure messaging system that encrypts an electronic document using a symmetric key and transmits the encrypted document and related message parameters to a recipient whose identity is then authenticated by a web server. The web server dynamically regenerates the symmetric key from a hidden key and from the message parameters accompanying the encrypted document, and thus avoids having to maintain a central repository of encrypted documents as required by typical "post and pick-up" encrypted messaging systems. Further, an audit trail provides time-stamped message digest data for a plurality of time intervals, where the message digests for adjacent time intervals are computationally linked together. The audit trail effectively enables time-stamped message digest data to verify not only the existence of a document during a first time interval, but also to verify the existence of documents encountered in a prior time interval.

Thus, an improved computer-implemented system and method for processing and distribution of unstructured documents is needed.

BRIEF DESCRIPTION OF THE DRAWINGS

Embodiments illustrated by way of example and not limitation in the figures of the accompanying drawings, in which.

DETAILED DESCRIPTION

A computer-implemented system and method for processing and distribution of unstructured documents are disclosed. In the following description, numerous specific details are set forth. However, it is understood that embodiments may be practiced without these specific details. In other instances, well-known processes, structures and techniques have not been shown in detail in order not to obscure the clarity of this description. Various embodiments are described below in connection with the figures provided herein.

Overview of Various Embodiments

The unstructured document processor and system of the various embodiments described herein enable an enterprise to efficiently receive, process, and distribute unstructured documents. The documents can be efficiently added to an existing enterprise record system and associated with the appropriate file or record in the enterprise record system. For example, a health care enterprise can process received facsimile (fax) documents and efficiently add the fax documents to an electronic medical record (EMR) system. Additionally, the fax documents can be routed to an out-going fax server and automatically faxed to appropriate recipients. Outgoing documents can also be routed to an individual recipient, an enterprise, an email address, a network address, a printer, an email server, a network device, a mobile device, another fax system, a rendering device, and/or a storage device. It will be understood that recipients as used herein can include any of these document destinations.

Other applications for the systems and methods disclosed herein include unstructured document processing and distribution for debt collection operations, academic institutions, government agencies, financial institutions, media/communications organizations, and manufacturing companies.

Description of the Unstructured Document Processor of an Example Embodiment

Figure 1:
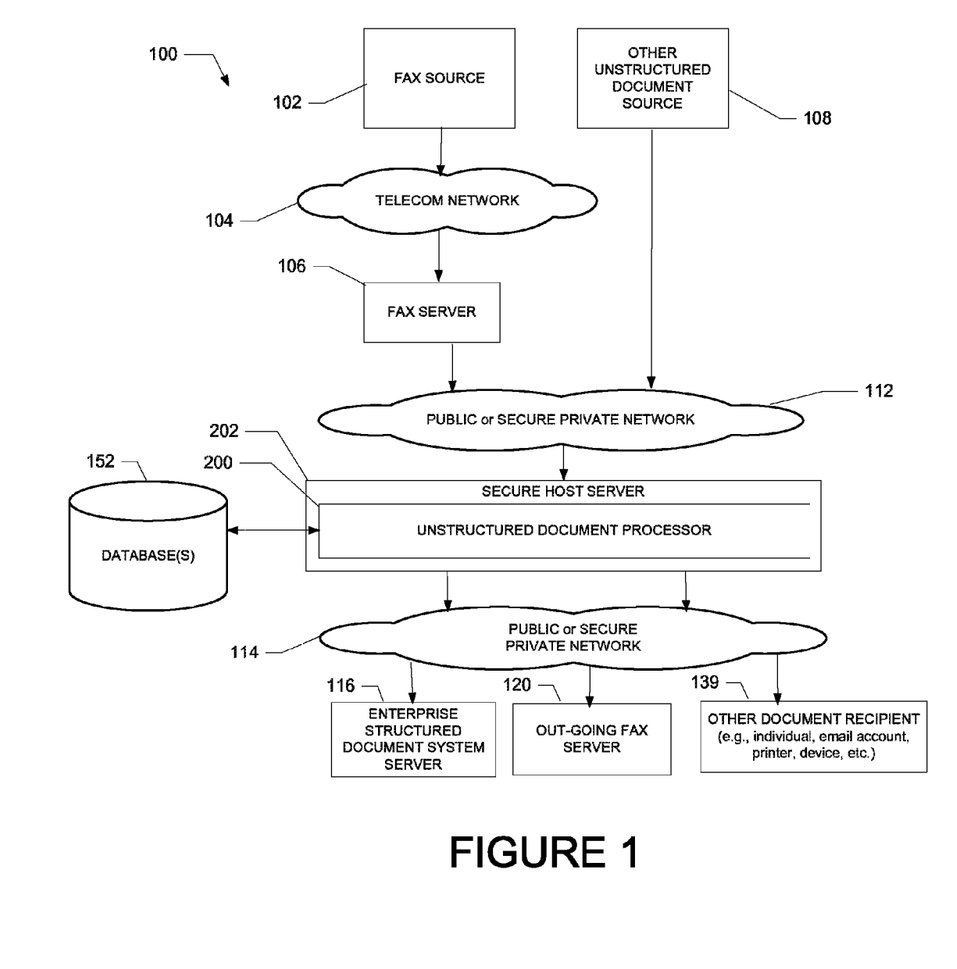
FIG. 1 illustrates an example networked system in which various embodiments may operate.

FIG. 1 illustrates an example networked system 100 in which various embodiments may operate. As shown, unstructured documents can originate from a variety of sources. A conventional facsimile (fax) transmitting device 102 can use the standard telephone (circuit-switched) network 104 to convey an unstructured fax document to a fax server 106. The fax server 106 can store received fax documents in a data store. The fax server 106 can be accessed via a conventional public network (e.g., the internet) or via a secure private network 112 (e.g., a local area network (LAN) or an enterprise operating a private network). Standard data encryption technologies can be used to protect data transfers to/from the fax server 106 using either a public or private network 112.

A secure host server 202 executing processing logic associated with an unstructured document processor 200 can be used to implement the novel techniques described herein. The host server 202 can be a data processing system, such as the system described below in connection with FIG. 8. Such a data processing system can communicate with the fax server 106 via network 112 using conventional interfaces and protocols. The host server 202 can thereby obtain the unstructured documents received by the fax server 106 from the variety of sources. The host server 202 can also obtain unstructured documents received by other document sources 108 via network 112. It will be apparent to those of ordinary skill in the art that a user can access the host server 202 via a client device and the data network 112 using conventional interfaces and protocols. The unstructured document processor 200 can save backups of received documents, associated data sets, and associated log files in a data storage archive, such as database 152.

Using the various novel techniques described herein, the unstructured document processor 200 can process and distribute these unstructured documents in a variety of ways. For example, as shown in FIG. 1, processed documents can be transmitted to an enterprise structured document system server 116 via a public or private network 114. A medical organization EMR system is one example of such an enterprise structured document system server 116. A financial organization server is another example of a server 116. The unstructured document processor 200 can also process and distribute these unstructured documents to an out-going fax server 120 via a public or private network 114. The outgoing fax server 120 can subsequently cause the documents to be faxed to one or more identified recipients. The unstructured document processor 200 can also process and distribute unstructured documents to other document recipients 139, such as individual recipients, email addresses, network addresses (Internet Protocol—IP addresses or Uniform Resource Locators—URL's), output devices (e.g., printers, fax machines, displays, etc.), communication devices (e.g., an email server, an instant messaging—IM server, a network device, a mobile device, another fax system, etc.), and/or storage devices. Further details on the unstructured document processor 200 are provided below.

Figure 2:
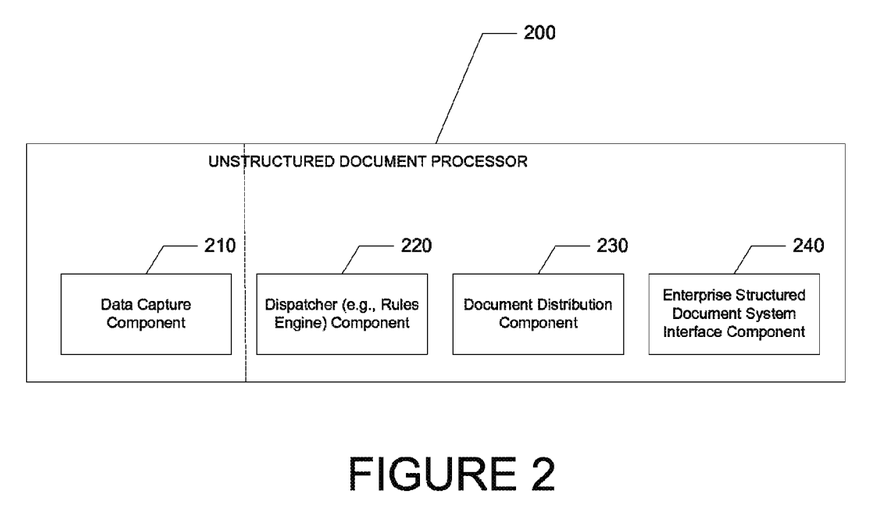
FIG. 2 illustrates an example embodiment showing the functionality components of the unstructured document processor of a particular embodiment.

FIG. 2 illustrates an example embodiment showing the functionality components of the unstructured document processor 200 of a particular embodiment. In a particular embodiment, the unstructured document processor 200 includes a data capture component 210, a dispatcher component 220, a document distribution component 230, and an enterprise structured document system interface component 240. As shown by the dotted line in FIG. 2, the data capture component 210 can be implemented as a separate executable component distinct from the components 220, 230, and 240. Similarly, other embodiments can implement the unstructured document processor 200 as combined or separate functional components.

The data capture component 210 is responsible for implementing interfaces and functionality for gathering information related to a received unstructured document. In one example, the information related to a received unstructured document is gathered from a reviewer for whom the received unstructured document is displayed via a user interface. As used herein, a reviewer can be a user, enterprise representative, document specialist, or other individual with authorized data access to use unstructured document processor 200 and a host server 202 upon which the unstructured document processor 200 is executed. The reviewer can operate the user interface to read portions of the received unstructured document and operate the user interface to input the information related to the received unstructured document into data fields of the user interface. In this manner, the reviewer can input information related to the received document, including, the addressee of the document, the originator of the document, any identified account number or reference number, the category or type of document (e.g. invoice, lab result, request for service, etc.), the number of pages, and the like. The portions of the information obtained from the unstructured document and the data input by the reviewer via the user interface can be captured and stored in a data set corresponding to the processed document. The reviewer can use judgment to provide additional information about the document that may not have been determinable from the document itself using automated methods. This additional information can also be stored in the data set corresponding to the processed document.

Figure 2A:
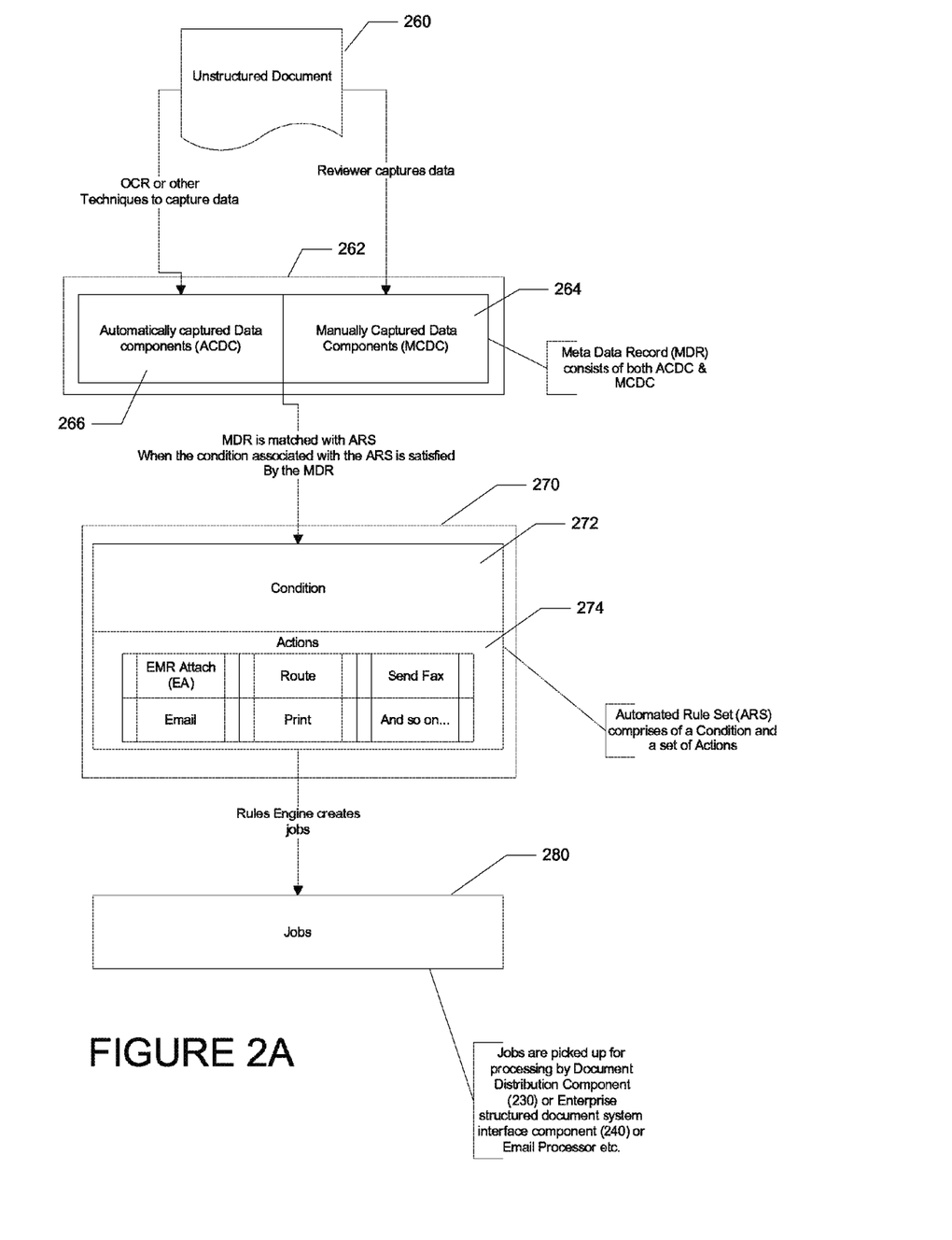
FIG. 2A illustrates a particular embodiment showing an example of the flow of an unstructured document through the processing performed in a particular embodiment.

In an example of a particular embodiment as illustrated in FIG. 2A, the reviewer can receive, for example, an unstructured document 260, such as a faxed document as a PDF formatted document from the fax server 106. The reviewer can open the PDF document and create a related metadata record (associated data set) 262 for the received document. Some information related to the received document can be captured automatically and stored as automatically captured data components (ACDC) 266 in the metadata record 262. For example, the time of entry/receipt of the document 260, the number of pages received, the source of the document 260, and other information can be captured automatically and stored in the metadata record 262 as automatically captured data components (ACDC) 266. Using the user interface provided by data capture component 210, the reviewer can also manually capture information for storage as manually captured data components (MCDC) 264 in the metadata record 262. For example, the reviewer can manually categorize the received document 260 (e.g., an Invoice), The reviewer can also capture the name of the originator of the document 260, the name(s) of the parties to whom the document is addressed (e.g., Dr. A), the name(s) of the parties to whom the document should be copied (e.g., Dr. C), account numbers, and other information provided in the document 260. This information can be captured and stored in the MCDC 264 of the metadata record 262.

Once the automatic and manual data components for the received document 260 have been saved in the metadata record 262 related to the document 260, an Automated Rule Set (ARS) 270 can be matched to the metadata record 262. An Automated Rule Set (ARS) 270 is comprised of a condition 272 and a set of actions 274. The ARS 270 can be created for a particular application during a system configuration phase. During an operations phase, the metadata record 262 can be matched with a particular ARS 270 when the condition 272 associated with the ARS 270 is satisfied by the information in a particular metadata record 262. For example, a particular ARS 270 may have been created, which includes a condition 272 that checks for a metadata record 262 with a category=Invoice, an addressee=Dr. A, and a copy addressee (cc:)=Dr. C. When the condition of the ARS 270 is matched to the information in the metadata record 262, the actions specified in the corresponding ARS 270 can be scheduled for processing by creating jobs 280 that will perform the specified actions 274. The created jobs 280 can be picked up for processing by the document distribution component 230, enterprise structured document system interface component 240, an email processor, or other component capable of performing one or more of the actions 274.

In an example of a particular embodiment as applied to a medical application, the reviewer can receive, for example, a faxed document as a PDF formatted document from the fax server 106. The reviewer can open the PDF document using the user interface provided by data capture component 210 and capture the following information, which can be used to relate the received fax with a record in an EMR system: 1) Patient Name, 2) Patient Date of Birth. 3) Document Category or Type, 4) Reading Doctor, 5) Service/Procedure Date, 6) Page numbers in the fax relevant to this patient, and 7) Recipients to whom the fax should be distributed. After obtaining the information summarized above from the received unstructured fax document, the reviewer can operate the user interface to store relevant information obtained from or associated with the received fax into a data set corresponding to the processed fax document.

In another example of the functionality provided by data capture component 210, the information related to a received unstructured document can also be gathered using automated techniques. For example, the date and time when the document was received can be captured automatically. Any meta-data related to the document can also be captured. In some cases, faxed documents carry associated meta-information including the originating telephone number, dialed telephone number, name of originator, page count, and comments. This meta-information related to the received unstructured document can be gathered using automated techniques. The automatically gathered information can be added to the data set corresponding to the processed document. Other automated techniques, such as optical character recognition (OCR) or bar code scanning can also be used to automatically gather information related to the received unstructured document. One or more of these automated or manual techniques can be used by the data capture component 210 to gather information related to the received unstructured document and to create a data set corresponding to the processed document.

Once the information related to the received unstructured document is gathered and stored in a data set as described above, the dispatcher component 220, shown in FIG. 2, can use the gathered information in the data set to automatically categorize, record, and dispatch the processed document for distribution to desired recipients. As part of the data capture operations described above, the reviewer can classify or categorize the received unstructured document by entering a document type or category code into the user interface. The particular document type or category code can be used to classify a particular document and thereby define a set of operations or behaviors for processing the document. For example, a particular document type or category code can be used to classify a particular document as an invoice, a drug prescription, a lab result, an insurance claim, a proof of payment, a receipt, a notice of litigation, or a variety of other types of documents. The document categories for a particular application can be pre-defined and configured in a pull-down menu, for example, for the reviewer to select. Each document category in a set of document categories for a particular application can have an associated rule set that defines a behavior with a corresponding set of actions or operations to perform as related to the particular document. These actions or operations are performed when an unstructured document in a corresponding category is received. For example, an invoice may be received by the unstructured document processor 200 of a particular embodiment. The reviewer may code the received invoice as being an 'invoice' category document. In this example, 'invoice' category documents have an associated rule set that defines a set of actions or operations that are performed when an invoice is received. These actions or operations may include automatically forwarding the received invoice to, for example, 1) an email address associated with an enterprise accounting department, and to, 2) an email address associated with the enterprise payables group. These actions or operations defined in the rule set may also include creating a new database record, performing a database query, generating a printed record, generating a network connection, or any other automated operation. A different rule set can define a different set of operations or behaviors for a different category of documents. In this manner, the reviewer can implicitly define a set of actions to perform on a received document by coding the document in a particular behavior category.

By virtue of the category coding given a particular document as described above, the dispatcher component 220 can automatically obtain the rule set associated with a particular received document. This rule set can be used by the dispatcher component 220 to perform the defined set of operations on the document. The information retained in the data set associated with the received document can be used by the dispatcher component 220 to perform the defined set of operations. For example, the rule set may define that the document should be forwarded to the addressee identified in the received document. As part of the data capture process as described above, the reviewer will have extracted the addressee information from the document and stored this information into the data set for the document. Thus, the addressee information will be available to the dispatcher component 220. Similarly, other information related to the document that is captured as part of the data capture process described above can be made available to the dispatcher component 220.

The dispatcher component 220 can use the captured information related to the document to dispatch the document in a manner defined by the rule set associated with the document category. Based on the captured information and the rule set, the dispatcher component 220 may dispatch the document in a variety of ways. In a particular embodiment, the dispatcher component 220 may queue the document and/or information associated with the document for routing to, for example, 1) an enterprise server, an out-going fax server, an email server, a peer-to-peer network node, a printer, a storage device, a rendering device, or other destination system or device. The dispatcher component 220 may also perform any needed encryption, compression, transcoding, translation, configuration, or message wrapping that may be necessary prior to the transmission of the document to a destination system or device. Depending upon the operations defined in the rule set for a particular document, the dispatcher component 220 can process and queue the received document for delivery to one or more recipients. As described in the example above, the processed document can be forwarded to one or more network-connected recipients, enterprise servers, fax servers, communication devices, output devices, and the like. In a particular embodiment, the dispatcher component 220 is responsible for determining how the received document is processed and to where the document is queued for delivery.

The dispatcher component 220 can also serve an administrative role in logging, tracking, archiving, and auditing the receipt and delivery of each received document. The dispatcher component 220 can automatically create a log entry in a document log when the received document is processed by the reviewer via the user interface of the data capture component 210. The log entry can include one or more of the data items retained in the data set associated with the received document. The log entry can also include status data indicating the disposition of the document as the document is processed by the unstructured document processor 200. For example, the log entry can record the fact that a particular document has been queued for delivery to one or more recipients. Later, when the document has been transmitted to the desired recipients by the document distribution component 230, the log entry can be updated to record the fact that document delivery has been completed. A communication between the document distribution component 230 and the dispatcher component 220 can be used to keep the status log entry current for each document. The details of the document distribution component 230 are provided below. Using the status log entries for each document, the dispatcher component 220 can perform tracking and auditing functions to reconcile the activity of the dispatcher component 220 with the activities of the document distribution component 230. In this manner, the dispatcher component 220 can determine if an operation performed for a particular document has failed and exception handling needs to be executed. For example, if document delivery to a particular recipient has timed out or returned an error condition, the dispatcher component 220 can take corrective action. This corrective action can include the queuing of the document for re-transmission, the transmission of an error report to a pre-defined location, the re-routing of the document to an alternate recipient, or the like. Exception handling rule sets can be pre-defined to specify a set of operations to be performed in the event of a document transmission error, non-delivery, mis-delivery, or the like. The dispatcher component 220 can also save backups of received documents, associated data sets, and associated log files in a data storage archive, such as database 152 (shown in FIGS. 1, and 3-4). At periodic pre-defined intervals, the dispatcher component 220 can schedule archiving operations to save received documents and related data in the archive. Depending upon the document category defined for a particular document, different rule sets can be pre-defined to specify a set of logging or archiving operations to be performed by the dispatcher component 220. The dispatcher component 220 can thereby be configured to perform a specific set of operations for each of the pre-defined set of document categories. Thus, the administrative role performed by the dispatcher component 220 can also be rule-driven in the same way that the document dispatching role of the dispatcher component 220 is rule driven. This provides a highly configurable and highly efficient unstructured document processing platform.

Figure 4:
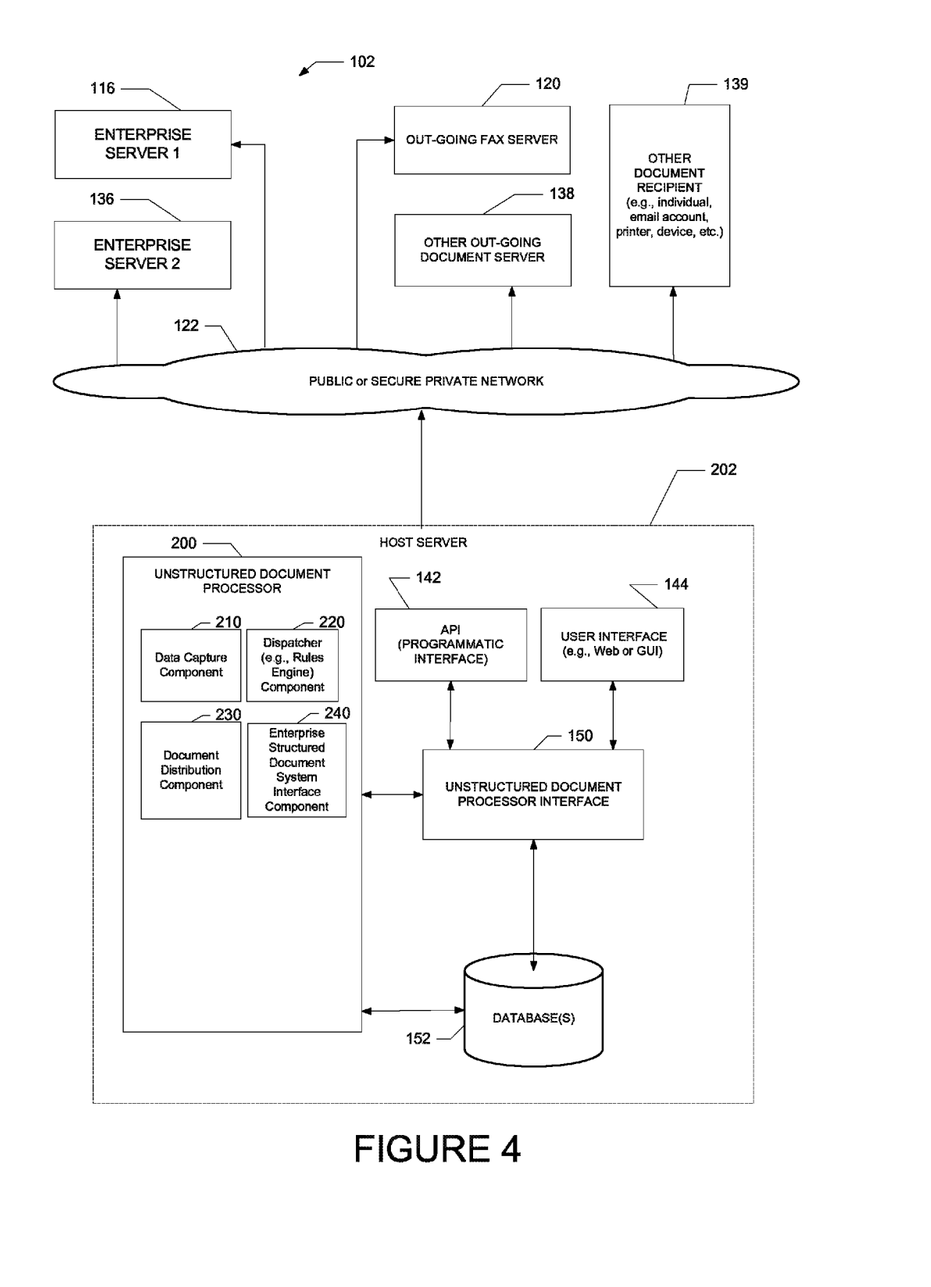
FIG. 4 illustrates another example networked system in which various embodiments may operate for processing and distribution of an out-flow of documents.
Figure 5:
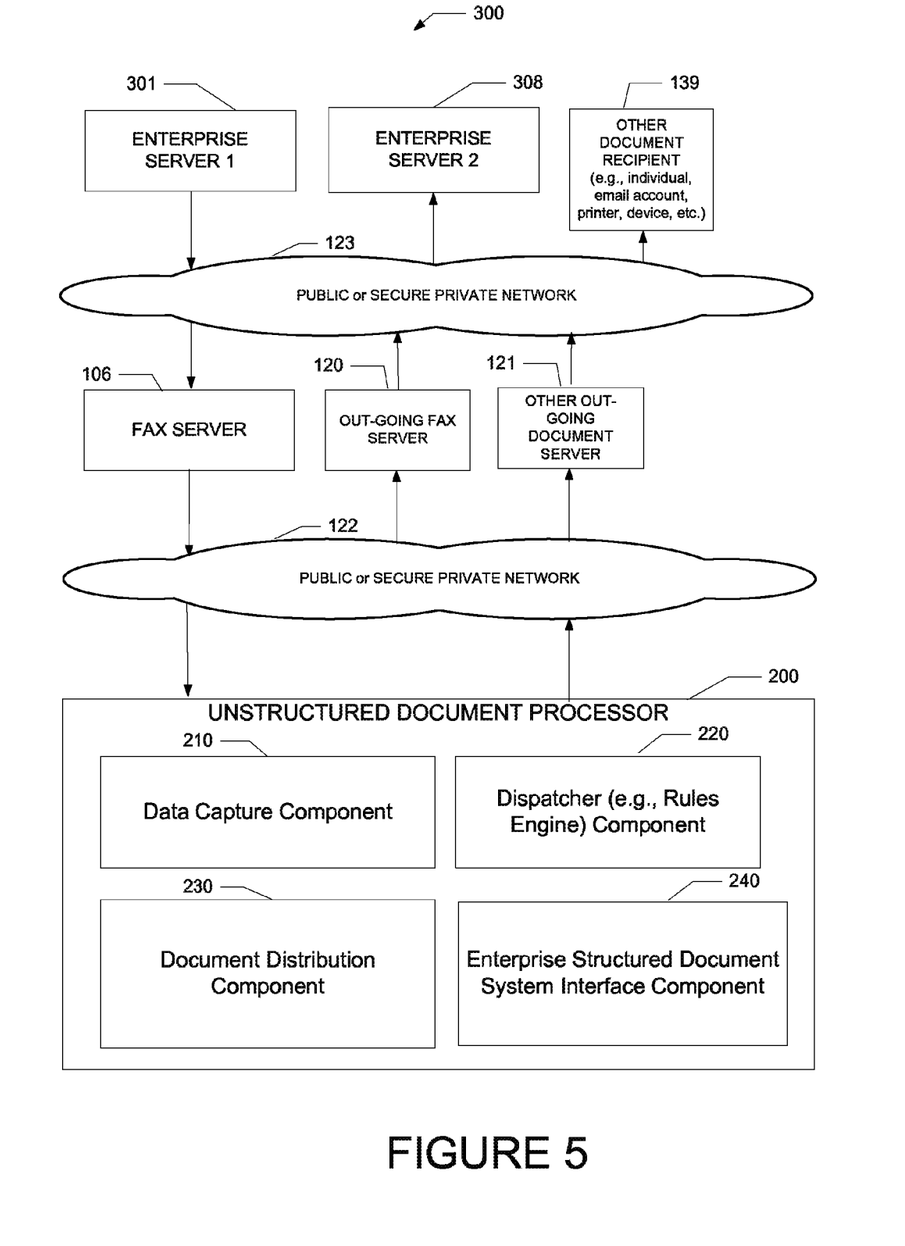
FIG. 5 illustrates another example networked system in which various embodiments may operate for processing and distribution of a flow of documents between enterprises.

Referring still to FIG. 2, the unstructured document processor 200 includes a document distribution component 230. The document distribution component 230 of a particular embodiment is responsible for routing and transmitting a processed document and related data to one or more intended recipients. As described above, the dispatcher component 220 can prepare processed documents and queue the documents for delivery by the document distribution component 230. As part of this processing, the address, fax number, or link to the intended recipient(s) can be included with the queued document. These recipients can include network-connected recipients, enterprise servers, fax servers, communication devices, output devices, and the like. FIGS. 4 and 5 illustrate example networked systems in which various embodiments may operate for processing and distribution of an in-flow and an out-flow of documents.

As shown in FIG. 4, the unstructured document processor 200 operating in a host server 202 of a particular embodiment can send a processed document and related data to one or more intended recipients via a public network or a secure private network 122. As shown in FIG. 4, these recipients can include one or more enterprise servers 116 and 136, an out-going fax server 120, another out-going document server 138, or another recipient 139, such as an individual recipient, an email account, an instant messaging account, a wireless device, another communication device, a storage device, an output device (e.g., printer, display, fax machine, etc.), or the like.

As shown in FIG. 5, the delivery of a particular processed document to one or more recipients can transition through one or more intervening devices or networks. For example, the unstructured document processor 200 can deliver a processed document and related data to enterprise server 308 via public network or a secure private network 122, out-going fax server 120, and public network or a secure private network 123. Similarly, the unstructured document processor 200 can deliver a processed document and related data to enterprise server 308 via public network or a secure private network 122, other out-going document server 121, and public network or a secure private network 123. Additionally, the unstructured document processor 200 can deliver a processed document and related data to another recipient 139 via public network or a secure private network 122, out-going fax server 120 or other out-going document server 121, and public network or a secure private network 123.

The public network or a secure private network 122 and 123 of a particular embodiment can be a conventional local area network (LAN) operating under a standard network protocol. In this embodiment, the host server 202 (shown in FIGS. 3 and 4) hosting the unstructured document processor 200 is given access to the LAN using standard access control mechanisms. The public network or a secure private network 122 and 123 can also be a conventional public network (e.g., the Internet) operating under a standard network protocol (e.g., TCP/IP). In this embodiment, standard encryption techniques and protocols can be used to provide a secure data transmission of the processed document between the unstructured document processor 200 and an intended recipient via the public network.

Referring again to FIG. 2, the unstructured document processor 200 includes an enterprise structured document system interface component 240. The enterprise structured document system interface component 240 of a particular embodiment is responsible for providing an interface between the unstructured document processor 200 and an enterprise-specific data processing or file management system. An electronic medical record (EMR) system is one example of such an enterprise-specific data processing system. A debt collection database is another example of such an enterprise-specific data processing system. In each instance of the enterprise-specific data processing system, special interface requirements may need to be implemented in order for the unstructured document processor 200 to communicate with the particular enterprise-specific data processing system. An application programming interface (API) may be provided by the enterprise-specific data processing system. The enterprise structured document system interface component 240 of a particular embodiment provides the functionality and interfaces to support communication with the API provided by the enterprise-specific data processing system. As shown in FIG. 4, the enterprise structured document system interface component 240 may use an API interface 142 to facilitate data communications with the API provided by the enterprise-specific data processing system. The enterprise structured document system interface component 240 allows the details of the interface with a specific enterprise data processing system to be hidden from the unstructured document processor 200 and the internal processing components of the enterprise structured document system. In this manner, the unstructured document processor 200 can be easily integrated a variety of different enterprise structured document systems.

The enterprise structured document system interface component 240 can also provide enterprise-specific configuration of the processed document and related data for entry or attachment of the document to the particular enterprise structured document system. The enterprise structured document system interface component 240 can also provide enterprise-specific process control, such as batch uploading documents to the enterprise structured document system at particular pre-defined times, intervals, and/or rates.

Figure 3:
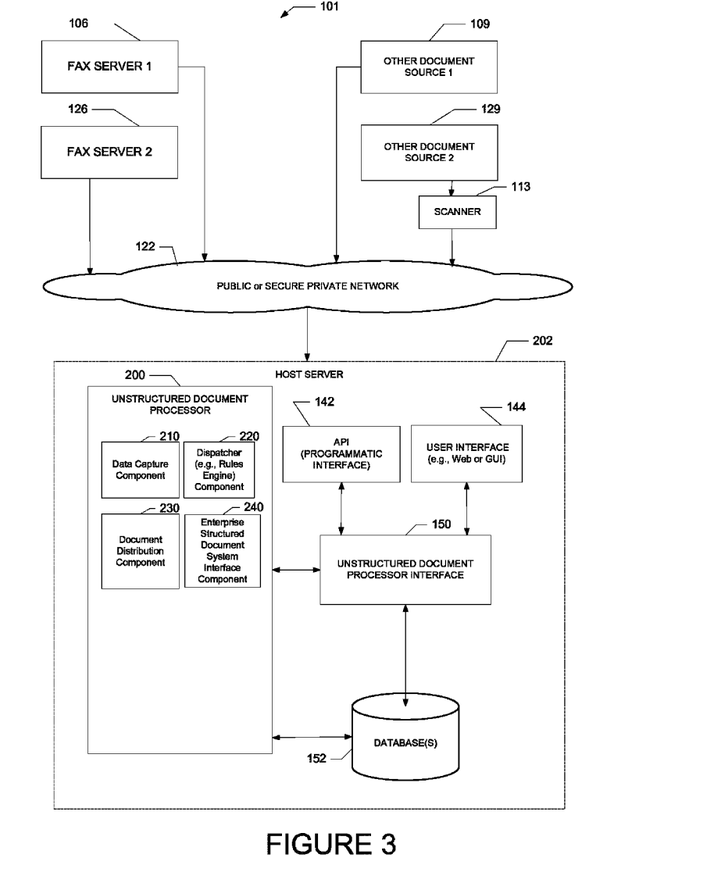
FIG. 3 illustrates another example networked system in which various embodiments may operate for processing and distribution of an in-flow of documents.

FIG. 3 illustrates another example networked system in which various embodiments may operate for processing and distribution of an in-flow of documents. As described above, the secure host server 202 can implement the unstructured document processor 200 of a particular embodiment. The host server 202 can also provide the user interface 144, described above, which is used primarily by the data capture component 210 to enable a reviewer to read, interpret, and input data related to a particular received unstructured document. In various embodiments, the user interface 144 can be implemented as a web interface or a graphical user interface. The host server 202 can also provide an application programming interface (API) 142, which can support the automated input and output of information to/from the unstructured document processor 200. As described above, the API 142 can work in concert with the enterprise structured document system interface component 240 to provide an enterprise compatible automated interface with a particular enterprise system. As shown in the embodiment of FIG. 3, the host server 202 can also provide an unstructured document processor interface 150 to facilitate data communications between the unstructured document processor 200 and user interface 144, API 142, and database 152. Database 152 can be used for storage of the received documents, related data sets, and log files. It will be apparent to those of ordinary skill in the art that database 152 can reside internally or externally to host server 202.

FIG. 3 also shows that host server 202 and unstructured document processor 200 therein can receive unstructured documents from a variety of sources as described above. These sources can include one or more fax servers 106 and 126, other document sources 109, or other document sources 129 via a scanner 113. These unstructured document sources are typically connected with host server 202 via a public or secure private network 122; but, the unstructured document sources can be directly connected to host server 202 as well.

Using the various novel techniques described herein, the unstructured document processor 200 can process and distribute these received unstructured documents in a variety of ways.

FIG. 4 illustrates another example networked system in which various embodiments may operate for processing and distribution of an out-flow of documents. As describe above, the unstructured document processor 200 operating in a host server 202 of a particular embodiment can send a processed document and related data to one or more intended recipients via a public network or a secure private network 122. As shown in FIG. 4, these recipients can include a variety of recipients as described above.

FIG. 5 illustrates another example networked system in which various embodiments may operate for processing and distribution of a flow of documents between document sources and document recipients. In the example of FIG. 5, an in-flow and example out-flows of documents are shown. The unstructured document processor 200 can receive unstructured documents from a variety of sources as described above. After processing these received documents, the unstructured document processor 200 can deliver processed documents and related data to one or more intended recipients via a public network or a secure private network 122 as shown in FIG. 5 and described above.

Figure 6:
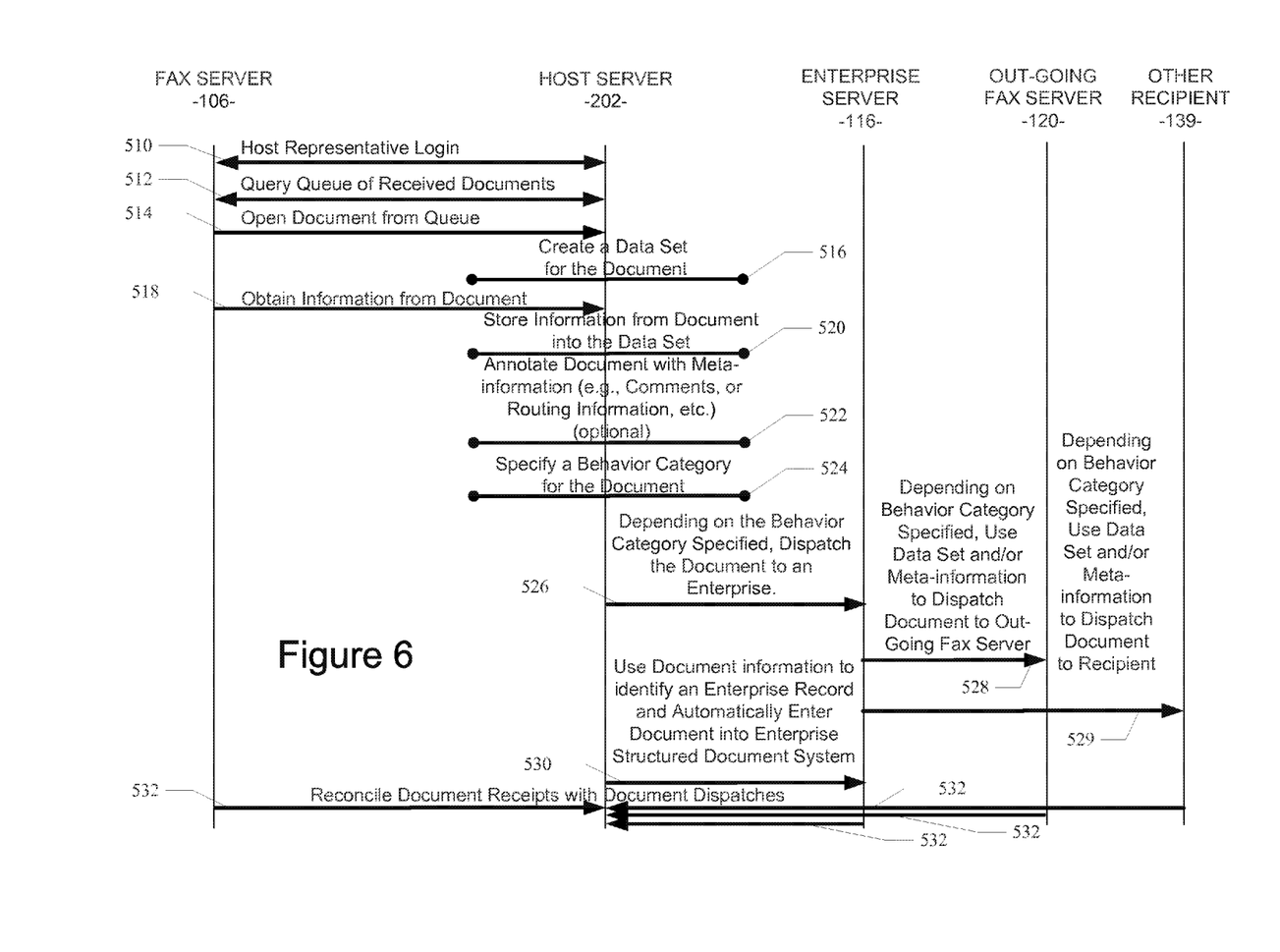
FIG. 6 is a sequence diagram illustrating a sequence of operations in an example embodiment.

FIG. 6 is a sequence diagram illustrating a sequence of operations in an example embodiment. In the described embodiment, several parties can be involved in several communications events that can occur in a typical interaction. One central party is the host server 202, which can host the unstructured document processor 200 and related components as described above. In an initial series of communication events, a representative or reviewer using the host server 202, and the unstructured document processor 200 operating therein, can log in to a fax server 106 in operation 510 shown in FIG. 6. It will be apparent to those of ordinary skill in the art that the representative or reviewer can access the host server 202 via a client device and a data network. It will also be apparent to those of ordinary skill in the art that the representative or reviewer can have an account with a user identifier to gain access to the unstructured document processor 200 and the documents maintained therein. In operation 512, the host server 202 can query the fax server 106 for a queue or list of received unstructured documents that may have been previously received by the fax server 106. In a similar manner, the host server 202 can query an enterprise server, an email server, a database, a website, and/or other unstructured document sources 109 and 129 as shown in FIG. 3. The host server 202 can receive a queue or list of received unstructured documents from these unstructured document sources as well. In operations 514 and 516, a reviewer can use the host server 202 to open a received unstructured document from the queue of received unstructured documents and create a data set file for the received unstructured document. In operations 518 and 520, using the user interface described above, the reviewer can gather information related to a received unstructured document as the received unstructured document is displayed to the reviewer via the user interface. The reviewer can operate the user interface to read portions of the received unstructured document and to input the information related to the received unstructured document into data fields of the user interface. The portions of the information obtained from the unstructured document and the data input by the reviewer via the user interface can be captured and stored in the data set created for the corresponding unstructured document. In operation 522, the reviewer can optionally annotate the received document with meta-information, such as comments, notes, routing information, file numbers, tracking information, and the like. In operation 524, the reviewer can classify or categorize the received unstructured document by entering a document type or behavior category code into the user interface as part of the data capture operations described above. The particular document type or category code can be used to classify a particular document and thereby define a set of operations or a behavior for processing the document. Depending on the behavior category defined for a particular document, the processed document may be dispatched to an enterprise server 116 in operation 526. Additionally, depending on the behavior category defined for a particular document, the processed document may be dispatched to an out-going fax server 120 in operation 528. Again, depending on the behavior category defined for a particular document, the processed document may be dispatched to other recipients 139 in operation 529. In operation 530, the information captured in the data set associated with the document may also be used to relate the received document with an enterprise record in an enterprise structured document system (e.g., an EMR system). The enterprise structured document interface component 240 can be used to automatically enter the processed document and portions of its related data set into the enterprise structured document system. In cases where the processed document cannot be automatically entered into the enterprise structured document system, a manual record for the processed document can be entered into the enterprise structured document system. In other embodiments, a link to the processed document can be entered into the enterprise structured document system. As the processed document is dispatched and delivered to each of the one or more recipients, a log entry and tracking file is updated and maintained for the processed document as described above. In operation(s) 532, the log and tracking data is used by the dispatcher component 220 to make sure the processed document is delivered to each of the recipients to which delivery was intended. As part of this process, document deliveries and receipts are reconciled with document dispatches in operation 532.

Figure 7:
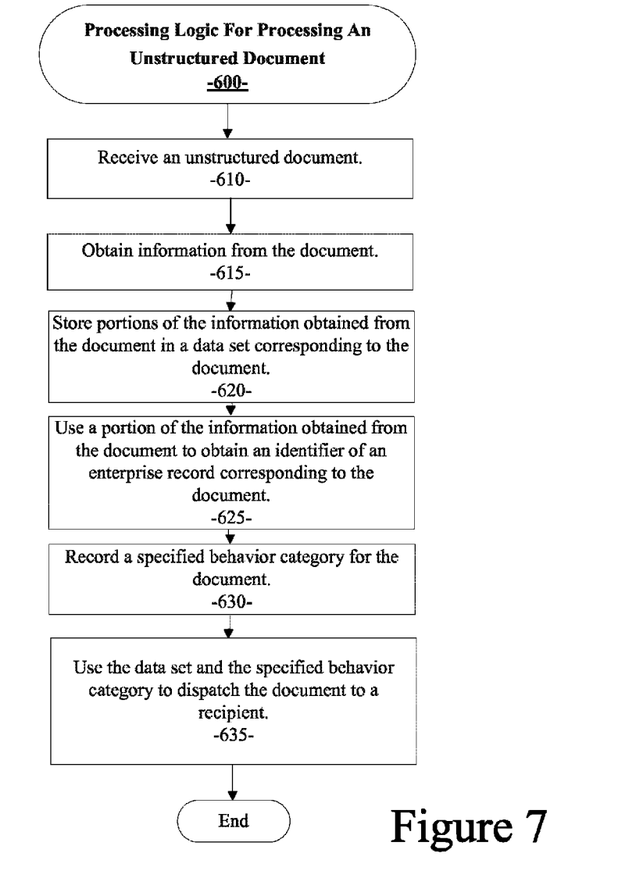
FIG. 7 is processing flow diagram illustrating a sequence of processing operations in an example embodiment.

FIG. 7 is a processing flow diagram illustrating a sequence of processing operations in an example embodiment. As shown in FIG. 7, processing operations of an example embodiment 600 include operations to: receive an unstructured document (Processing block 610); obtain information from the document (Processing block 615); store portions of the information obtained from the document in a data set corresponding to the document (Processing block 620); use a portion of the information obtained from the document to obtain an identifier of an enterprise record corresponding to the document (Processing block 625); record a specified behavior category for the document (Processing block 630); and use the data set and the specified behavior category to dispatch the document to a recipient (Processing block 635).

Figure 8:
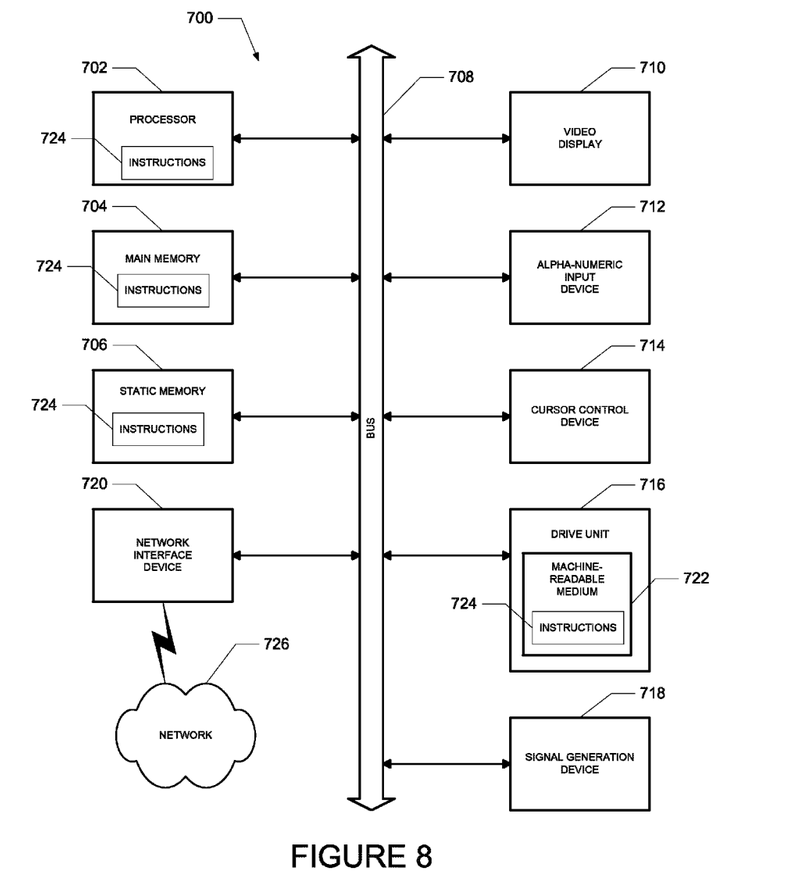
FIG. 8 shows a diagrammatic representation of a machine in the form of a computer system within which a set of instructions, for causing the machine to perform any one or more of the methodologies discussed herein, may be executed, according to an example embodiment.

FIG. 8 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for processing and distribution of unstructured documents are disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:
receiving an unstructured document;
receiving, via a user interface, information related to data fields of the received unstructured document;
classifying, via a user interface, the received unstructured document into one of a plurality of document categories thereby specifying an associated document category, each document category of the plurality of document categories having a different associated rule set that defines a behavior with a corresponding set of operations to perform as related to a particular document in the document category, the set of operations including operations for dispatching the document after information is obtained from the data fields of the document;
obtaining information from the document using the information related to data fields of the received unstructured document and the associated document category;
storing portions of the information obtained from the document in a data set corresponding to the document;
using a portion of the information obtained from the document to obtain an enterprise identifier corresponding to an intended recipient of the document;
obtaining an enterprise record identified by the enterprise identifier and the information in the data set;
using the data set and the enterprise identifier to dispatch the document to the intended recipient via an enterprise corresponding to the enterprise identifier; and
using the data set and the associated document category to dispatch the document by performing the operations defined by the associated document category.

2. The computer-implemented method as claimed in claim 1 wherein dispatching the document includes dispatching the document to an out-going fax server, if the operations defined by the associated document category specify routing the document by fax.

3. The computer-implemented method as claimed in claim 1 including reconciling dispatched documents with received documents.

4. The computer-implemented method as claimed in claim 1 including specifying particular pages of the document and dispatching only the specified pages of the document to the enterprise.

5. The computer-implemented method as claimed in claim 1 including annotating the document with a comment.

6. The computer-implemented method as claimed in claim 1 wherein the document is coded in a format from the group: Portable Document Format (PDF) format, bit mapped format, binary format, JPEG, GIF, TIF, MPEG format, and RTF.

7. The computer-implemented method as claimed in claim 1 including performing exception handling if dispatching the document produces an error.

8. The computer-implemented method as claimed in claim 7 wherein the exception handling including re-routing the document.

9. The computer-implemented method as claimed in claim 1 wherein the unstructured document is opened and the information is obtained from the document using an interface from the group: a web-based user interface, a graphical user interface, and an application programming interface (API).

10. A system comprising:
a computer;
an unstructured document source in data communication with the computer via a network; and
an unstructured document processor being operable by the computer, the unstructured document processor being configured to receive an unstructured document from the unstructured document source, receive, via a user interface, information related to data fields of the received unstructured document, classify, via a user interface, the received unstructured document into one of a plurality of document categories thereby specifying an associated document category, each document category of the plurality of document categories having a different associated rule set that defines a behavior with a corresponding set of operations to perform as related to a particular document in the document category, the set of operations including operations for dispatching the document after information is obtained from the data fields of the document, obtain information from the document using the information related to data fields of the received unstructured document and the associated document category, store portions of the information obtained from the document in a data set corresponding to the document, use a portion of the information obtained from the document to obtain an enterprise identifier corresponding to an intended recipient of the document, obtain an enterprise record identified by the enterprise identifier and the information in the data set, use the data set and the enterprise identifier to dispatch the document to the intended recipient via an enterprise corresponding to the enterprise identifier, and use the data set and the associated document category to dispatch the document by performing the operations defined by the associated document category.

11. The system as claimed in claim 10 wherein the intended recipient is the enterprise corresponding to the enterprise identifier.

12. The system as claimed in claim 10 wherein dispatching the document includes attaching the document to the enterprise record identified by the identifier, if the behavior category specifies enterprise system document entry.

13. A non-transitory machine-readable storage medium comprising machine executable instructions embedded thereon, which when executed by a machine, cause the machine to:
  receive an unstructured document from an unstructured document source;
  receive, via a user interface, information related to data fields of the received unstructured document;
  classify, via a user interface, the received unstructured document into one of a plurality of document categories thereby specifying an associated document category, each document category of the plurality of document categories having a different associated rule set that defines a behavior with a corresponding set of operations to perform as related to a particular document in the document category, the set of operations including operations for dispatching the document after information is obtained from the data fields of the document;
  obtain information from the document using the information related to data fields of the received unstructured document and the associated document category;
  store portions of the information obtained from the document in a data set corresponding to the document;
  use a portion of the information obtained from the document to obtain an enterprise identifier corresponding to an intended recipient of the document;
  obtain an enterprise record identified by the enterprise identifier and the information in the data set;
  use the data set and the enterprise identifier to dispatch the document to the intended recipient via an enterprise corresponding to the enterprise identifier; and
  use the data set and the associated document category to dispatch the document by performing the operations defined by the associated document category.

14. The article of manufacture as claimed in claim 13 wherein dispatching the document includes attaching the document to an enterprise record identified by the enterprise identifier, if the operations defined by the associated document category specify enterprise system document entry.

* * * * *